Figure 1:
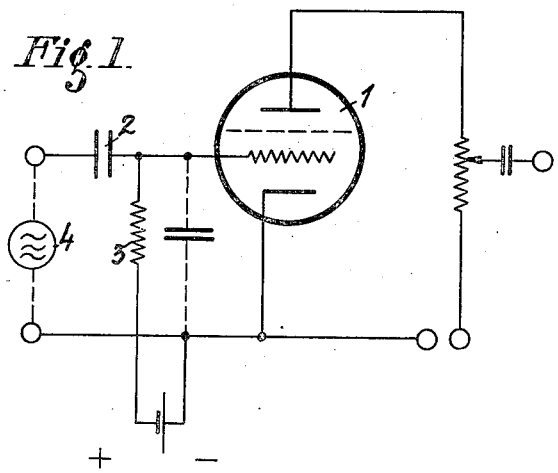

Jan. 26, 1937.  K. SCHLESINGER  2,068,768

DETECTOR FOR ULTRA SHORT WAVES

Filed March 26, 1934

Inventor:

Kurt Schlesinger.

Patented Jan. 26, 1937

2,068,768

UNITED STATES PATENT OFFICE 2,068,768

DETECTOR FOR ULTRA SHORT WAVES

Kurt Schlesinger, Berlin, Germany

Application March 26, 1934, Serial No. 717,310
In Germany March 29, 1933

1 Claim. (Cl. 250—27)

The audion arrangements hitherto known are not capable of practical use in connection with very high modulating frequencies. When using these arrangements for television apparatus there is obtained a contrast reproduction which is weak and lacking in sharpness and also a veil in white.

It has been found that the first error referred to is due to the fact that the charging period in the case of technical tubes is by no means sufficiently short, so that losses in amplitude occur in the order of 1:1,000 and the peak potential is not reached. The veil formation is due to a too slow discharge.

According to the invention, the elements of the arrangement are dimensioned in such fashion that the periods of charge and discharge are smaller than or at the most equal to the period of oscillation of the extreme frequency to be transmitted (maximum frequency, for example, in the case of a 180-line image 540 k. c.).

Furthermore means are provided which enable the carrier frequency to be compensated fully without loss of amplitude even if the same is in a ratio of merely 2:1 to the extreme wave of the useful frequency.

The charging period $\tau_a$ is proportional to the product of $R_{i_g}$ (equivalent resistance of the grid path) and the total capacity (i. e., the total of coupling capacity and grid cathode capacity).

For example in the transmission of a 180-line image (extreme frequency 540 k. c.) there results according to the invention $$\tau_a \leq \frac{1}{540 \text{ k. c.}} \approx 2 ms.$$

In order to attain this extremely short charging period the total capacity, in accordance with the invention, is reduced as far as possible.

Taking as a basis the known tubes there results in accordance with the invention a maximum permissible total capacity of $5 \cdot 5 \cdot 10^{-6}$ to $1 \cdot 1 \cdot 10^{-5}$ mf.

In order to obtain the greatest possible degree of efficiency this total capacity, in accordance with the invention, is distributed in such fashion that the grid cathode capacity is made as small as possible and the capacity of the coupling condenser as large as possible.

Tubes are accordingly employed having separate lead-in connections for the grids at the top of the tube (socalled Horn type having a cathode grid capacity of: $C_{gk} = 3 \cdot 3 \cdot 10^{-6} - 4 \cdot 4 \cdot 10^{-6}$ mf.), and the coupling condenser selected at merely $2 \cdot 2 \cdot 10^{-6}$ to $6 \cdot 6 \cdot 10^{-6}$ mf.

The discharge period is proportional to the product of grid leak resistance and total capacity. According to the invention, there is selected $$\tau_e \leq \frac{1}{f_{max}},$$

$\tau_e$ being the time constant,
$f_{max}$ being the maximum modulation frequency of the television frequency band.

For television receiving apparatus for the reception of 180-line images there results in this connection according to the invention, taken on a basis of the extreme capacity necessary for attaining the period of charge, $R_g \approx 10^5$ ohms.

Figure 2:
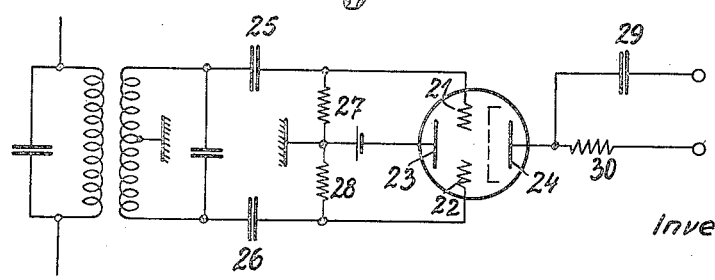

A form of embodiment of the invention is illustrated by way of example in the drawing, in which Fig. 1 shows a grid leak detector arrangement using a screening grid valve. Fig. 2 shows a grid leak detector arrangement according to the invention making use of a twin-grid valve connected in push-pull.

With reference to Fig. 1 there designates 1 a screening grid detector audion with passed-out grid lead, 2 the coupling condenser, which in accordance with the invention is selected at $2 \cdot 2 \cdot 10^{-6}$ to $6 \cdot 6 \cdot 10^{-6}$ mf. (for an extreme frequency amounting to 540 k. c.), and 3 the grid leak resistance, which possesses a value of approximately $10^5$ ohms. The potential to be rectified is indicated symbolically by 4.

In Fig. 2 there is illustrated a detector compensation connection system making use of a twin grid tube.

Relating to Fig. 2 there is shown an arrangement according to the invention using a twingrid valve, which is known per se. Two electrically equivalent grids 21 and 22 are situated opposite the cathode 23, and are fed by equal amplitude of the carrier wave, but with opposite phase. The carrier wave itself, as known per se, does then not occur in the anode circuit 24 at all. According now to the invention, each of the two grid circuits is so built up that it possesses only a very small coupling capacity for example is terminated by a very small grid block 25 or 26 corresponding with the above statements and is provided with a corresponding resistance 27 and 28. The connection system is then capable of supplying the highest modulating frequencies occurring in the image, there also being the additional advantage that the grid detection effect may be controlled up to complete suppression of the anode current, whilst the same, as well known, in the case of single-grid detector values is impossible on account of the anode rectification then occurring. When using very short carrier waves it is impossible to employ band filters as shown and accordingly also to produce in ready fashion the push-pull potential for the second grid 22 by tapping the input-secondary in its midpoint which is connected to ground. If on the other hand resistance coupling is employed in the intermediate frequency amplifier, it is impossible, generally speaking, to avoid the use of a phase-reversing tube. The image-current frequency, devoid of carrier waves, is withdrawn at the resistance 30 over the condenser 29.

The arrangement according to the invention enables a rectification of all frequencies from 25 periods up to 540 k. c. to be accomplished with good degree of efficiency, and at the same time to eliminate fully by compensation the merely very little shorter carrier wave (for example 200 or 250-metre wave).

I claim:

In a television receiving system a grid leak detector arrangement for the rectification of carrier frequencies modulated with very high frequencies above audibility such as used in television art comprising a twin-grid detector valve for grid-leak detector, having two grids connected in push-pull connection via an input secondary winding which is earthed at its midpoint, in each of the two grid-circuits of said detector valve a condenser and a grid-leak resistance the total capacity of each grid-circuit including the electrode capacities amounting to a maximum capacity of $1 \cdot 1 \cdot 10^{-5}$ mf. and each grid leak resistance having a value of approximately $10^5$ ohms, said detector valve being constructed to have a minimum of grid-cathode capacity of approximately $3 \cdot 3 \cdot 10^{-6}$ to $4 \cdot 4 \cdot 10^{-6}$ mf., said condenser having a capacity of approximately $2 \cdot 2 \cdot 10^{-6}$ to $6 \cdot 6 \cdot 10^{-6}$ mf.

KURT SCHLESINGER.